(12) United States Patent
Cheung et al.

(10) Patent No.: US 11,907,004 B2
(45) Date of Patent: Feb. 20, 2024

(54) CONFIGURABLE TRANSMITTER DEVICE BASED ON DATA RATE

(71) Applicant: eTopus Technology Inc., San Jose, CA (US)

(72) Inventors: Tze Yin Cheung, Hong Kong (CN); Paul K. Lai, Los Gatos, CA (US); Danfeng Xu, Cupertino, CA (US)

(73) Assignee: ETOPUS TECHNOLOGY INC., San Jose, CA (US)

( * ) Notice: Subject to any disclaimer, the term of this patent is extended or adjusted under 35 U.S.C. 154(b) by 0 days.

(21) Appl. No.: 17/850,738

(22) Filed: Jun. 27, 2022

(65) Prior Publication Data
US 2023/0418322 A1 Dec. 28, 2023

(51) Int. Cl.
*G06F 1/06* (2006.01)
*G06F 13/40* (2006.01)

(52) U.S. Cl.
CPC ............ *G06F 1/06* (2013.01); *G06F 13/4022* (2013.01)

(58) Field of Classification Search
CPC .............................. G06F 1/06; G06F 13/4022
See application file for complete search history.

(56) References Cited

U.S. PATENT DOCUMENTS

| | | | | |
|---|---|---|---|---|
| 7,474,612 B1* | 1/2009 | Patel | ........................ | H04J 3/062 370/503 |
| 7,945,880 B1* | 5/2011 | Albrecht | ............. | G06F 30/3312 716/108 |
| 11,150,687 B1* | 10/2021 | Mohan | ...................... | G06F 1/04 |
| 2002/0075981 A1* | 6/2002 | Tang | ..................... | H04J 3/0685 375/372 |
| 2010/0122104 A1* | 5/2010 | Defazio | ................... | G11C 7/22 713/401 |
| 2014/0153620 A1* | 6/2014 | Longo | ..................... | H04L 27/02 375/219 |
| 2015/0378952 A1* | 12/2015 | Chen | ....................... | H04B 3/58 710/105 |
| 2017/0017604 A1* | 1/2017 | Chen | ................... | G06F 11/3027 |
| 2018/0181502 A1* | 6/2018 | Jen | ...................... | G06F 13/4022 |
| 2019/0034376 A1* | 1/2019 | Das Sharma | ....... | G06F 12/1027 |
| 2019/0179793 A1* | 6/2019 | Michna | ................. | G06F 15/163 |
| 2021/0311800 A1* | 10/2021 | Rao | ...................... | G06F 9/4413 |
| 2021/0311895 A1* | 10/2021 | Das Sharma | ....... | G06F 13/4081 |
| 2022/0137848 A1* | 5/2022 | Lim | ..................... | G06F 3/0613 711/154 |

OTHER PUBLICATIONS

Kossel, Marcel et al., Slides accompanying "An 8b DAC-based SST TX using metal gate resistors with 1.4pJ/b efficiency at 112Gb/s PAM4 and 8-taps FFE in 7nm CMOS," ISSCC, Feb. 2021, 36 pages.

(Continued)

*Primary Examiner* — Faisal M Zaman
(74) *Attorney, Agent, or Firm* — FENWICK & WEST LLP

(57) ABSTRACT

A transmitter device includes a configurable timer circuit that adjusts timing of input data for serial transmission of the input data. The configurable timer circuit may be configured depending on the configured data rate of the transmitter device. In one embodiment, the configurable timer circuit includes a plurality of configurable retimers that retime the input data where at least a portion of one of the plurality of configurable retimers is enabled based on the configured data rate.

20 Claims, 13 Drawing Sheets

(56) References Cited

OTHER PUBLICATIONS

Kim, Jihwan et al. "A 224Gb/s DAC-Based PAM-4 Transmitter with 8-Tap FFE in 10nm CMOS," ISSCC, pp. 126-128, Feb. 2021.
Kossel, Marcel et al. "An 8b DAC-based SST TX using metal gate resistors with 1.4pJ/b efficiency at 112Gb/s PAM4 and 8-taps FFE in 7nm CMOS," ISSCC, pp. 130-132, Feb. 2021.
International Search Report and Written Opinion, Patent Cooperation Treaty Application No. PCT/US2023/026260, dated Jul. 28, 2023, 8 pages.

* cited by examiner

CONFIGURABLE TRANSMITTER DEVICE BASED ON DATA RATE

BACKGROUND

1. Field of Art

The disclosure generally relates to a transmitter device, more specifically to a configurable transmitter device including a reconfigurable timer circuit that is configurable based on a data rate of the transmitter device.

2. Description of the Related Art

High speed communication systems transfer data over communication links at high data rates (e.g., 10 GS/s and beyond). Conventional transmitter devices in high speed communications systems are configured to operate at a single data rate. Thus, conventional transmitter devices lack flexibility to operate in different environments that require different data rates. Furthermore, conventional transmitter devices are configured to process incoming digital data for transmission in a parallel manner. However, the parallel processing of the digital data results in increased latency in conventional transmitter devices.

SUMMARY

In one embodiment, a transmitter device includes a configurable timer circuit that adjusts timing of input data for serial transmission of the input data. The configurable timer circuit may be configured depending on the configured data rate of the transmitter device. In one embodiment, the configurable timer circuit includes a plurality of configurable retimers and a plurality of configurable multiplexors that are connected to the plurality of configurable retimers.

Each of the configurable retimers is configured to receive input data for a corresponding bit of the input data and adjust a timing of the input data to generate retimed input data. Each configurable multiplexor is connected to a corresponding configurable retimer and receives the retimed input data output by the configurable retimer. The configurable multiplexors select portions of the retimed input data for output according to a plurality of different selection signals in order to serialize the retimed input data for output by the transmitter device. Depending on the configured data rate of the transmitter device, different portions of the configurable retimers and configurable multiplexors are enabled and disabled to transmit the retimed input data at the configured data rate.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes only, and may not have been selected to delineate or circumscribe the inventive subject matter.

BRIEF DESCRIPTION OF DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality.

System Environment

Figure 1:
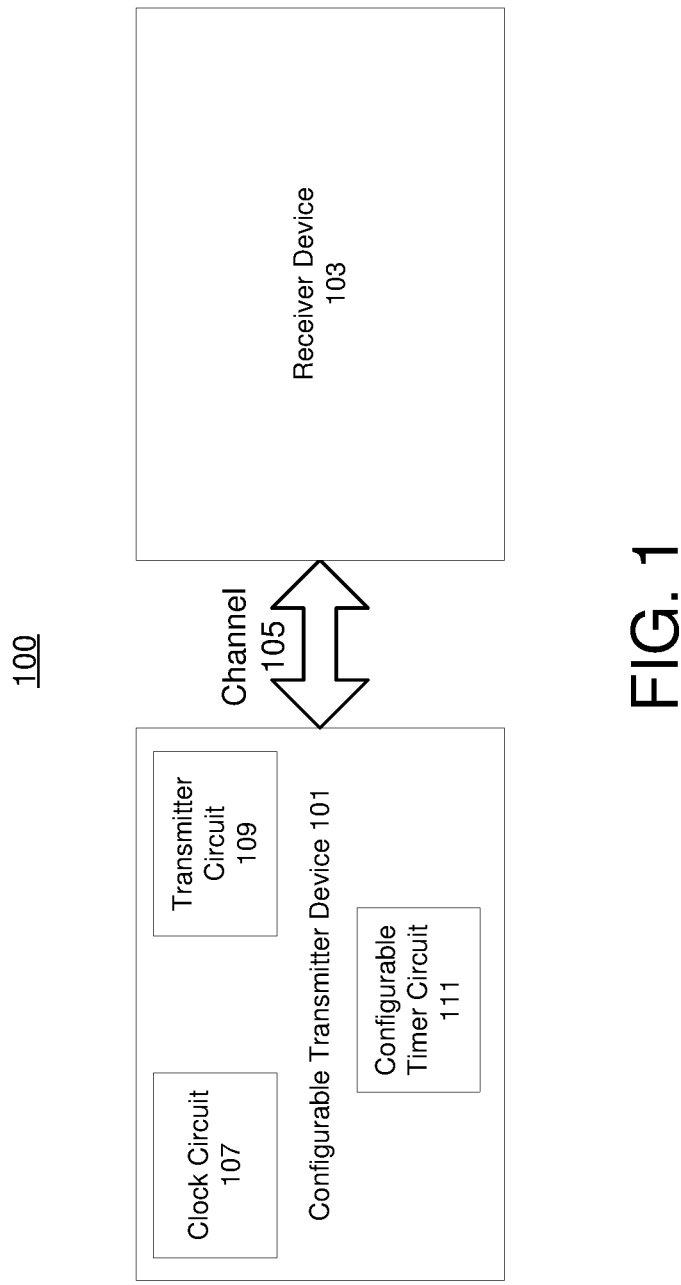
FIG. 1 illustrates a high-speed communication system that includes a configurable transmitter device and a receiver device in communication via a channel according to an embodiment.

FIG. 1 is a high speed communication system 100 that includes a configurable transmitter device 101 (hereinafter referred to as "transmitter device 101") and a receiver device 103 coupled to each other through a communications channel 105, according to one embodiment. The communications channel 105 can be, for example, a copper communication channel found in a computing backplane that carries single ended or differential signals. The communications channel 105 can also be, for example, an optical communication channel that carries optical signals.

The transmitter device 101 transmits a channel signal to the receiver 103 across the channel 105. The channel signal is an analog signal transmitted by the transmitter device 101 that represents digital data. As shown in FIG. 1, the transmitter device 101 includes a clock circuit 107 configured to generate clock signals, a transmitter circuit 109 configured to transmit the channel signal according to the generated clock signals, and a configurable timer circuit 111 configured to convert data included in the channel signal into serial form according to one embodiment. The transmitter device 101 may have other circuits than shown in FIG. 1. In some embodiments, the transmitter device 101 may be a stand-alone device or a part of a larger device, such as an application specific integrated circuit (ASIC).

The receiver device 103 recovers the digital data from the channel signal received from the transmitter device 101 via the channel 105. In one embodiment, the receiver device 103 generates a digital data output representing the estimated digital value of the channel signal. In some embodiments, the receiver device 103 may be a standalone device or a part of a larger device, such as an application specific integrated circuit (ASIC).

Transmitter Device Architecture

Figure 2:
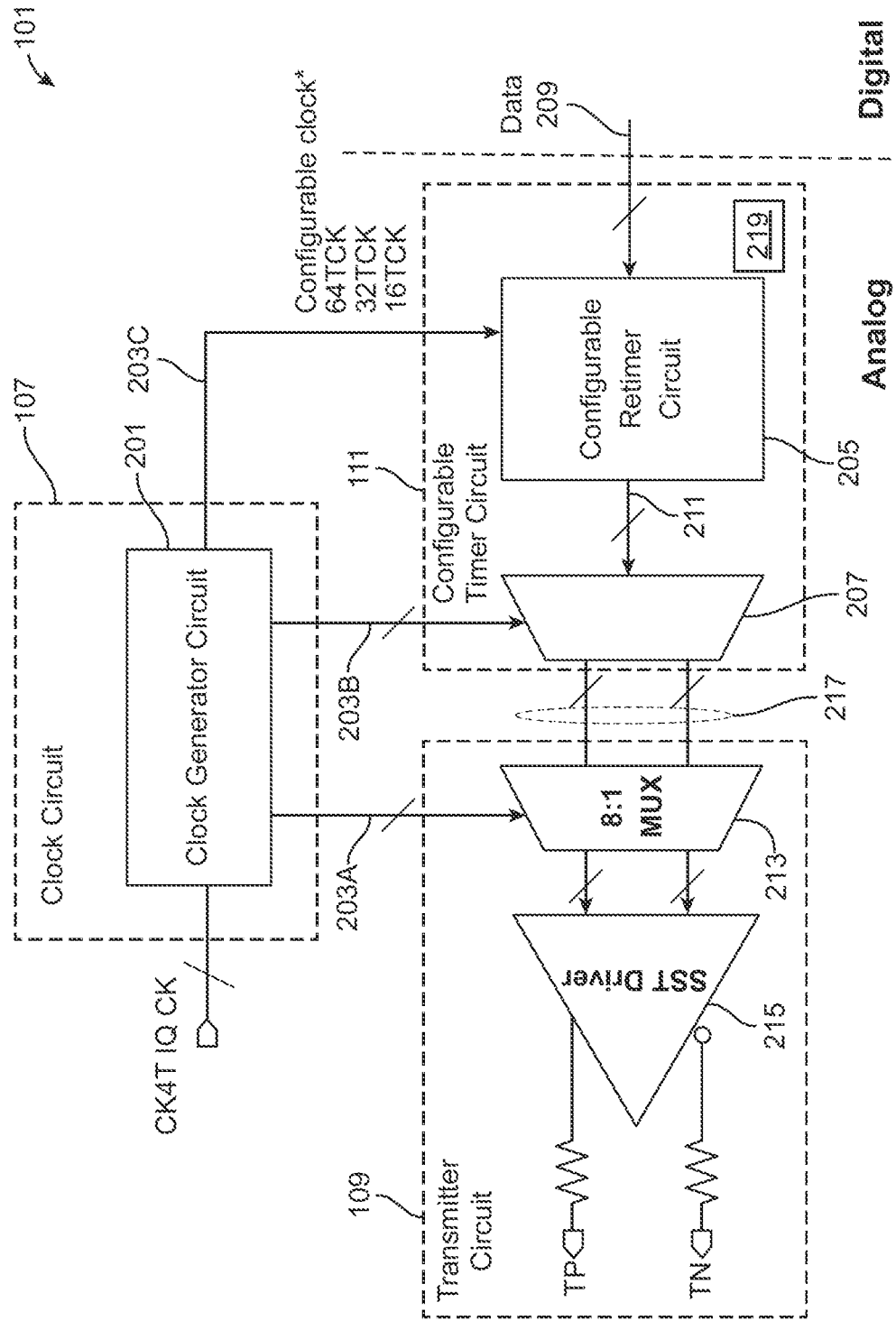
FIG. 2 is a detailed block diagram of the configurable transmitter device, according to an embodiment.

FIG. 2 illustrates a detailed view of the transmitter device 101 according to one embodiment. As mentioned above, the transmitter device 101 includes the clock circuit 107, the transmitter circuit 109, and the configurable timer circuit 111. The clock circuit 107 includes a clock generator circuit 201. In one embodiment, the clock generator circuit 201 generates clock signals 203. The clock signals 203 include clock signals 203A transmitted to the transmitter circuit 109 that control the timing at which the transmitter circuit 109 transmits the channel signal to the receiver device 103. The clock signals 203 also include a configurable clock signal 203B that are selection signals that control the timing at which the configurable timer circuit 111 outputs serial data to the transmitter circuit 109 for transmission in the channel signal, and a configurable clock signal 203C that controls the timing at which data for transmission is adjusted (e.g., retimed), as will be further described below. The configuration of the configurable clock signals 203B and 203C are dependent on the configured data rate of the transmitter device 101.

In one embodiment, the transmitter device 101 can be configured to operate in one of a plurality of data rates. For example, the transmitter device 101 may operate in a first mode associated with transmitting data at the first data rate (e.g., 56G baud rate) that corresponds to a maximum data rate of the transmitter device 101, may operate in a second mode associated with transmitting data at the second data rate (e.g., 16G baud rate) that corresponds to a minimum data rate of the transmitter device 101, or may operate in a third mode associated with transmitting data at the third data rate (e.g., 32G baud rate) that corresponds to the intermediate data rate of the transmitter device 101. By being able to reconfigure the transmitter device 101, the transmitter device 101 can support legacy communication standards. A setting that configures the data rate for the transmitter device may be stored in a register 219 included in the configurable timer circuit 111, for example.

As mentioned previously, the configurable clock signals 203B and 203C are configured depending on the data rate of operation (e.g., the mode) of the transmitter device 101. For example, the configurable clock signals 203C may be a 64T clock signal while the transmitter device 101 is operating at the first data rate (e.g., 56G baud rate) that corresponds to the maximum data rate of the transmitter device 101, a 16T clock signal while the transmitter device 101 is operating at the second data rate (e.g., 16G baud rate) that corresponds to the minimum data rate of the transmitter device 101, or a 32T clock signal while the transmitter device 101 is operating a third data rate (e.g., 32G baud rate) that corresponds to an intermediate data rate of the transmitter device 101.

In one embodiment, the configurable timer circuit 111 serializes the input data 209 for transmission by the transmitter circuit 109. The configurable timer circuit 111 includes a configurable retimer circuit 205 and a configurable multiplexor circuit 207 in one embodiment. As will be further described below, the components of the configurable retimer circuit 205 and the configurable multiplexor circuit 207 are reconfigured based on the data rate of operation of the transmitter device 101.

Generally, the configurable retimer circuit 205 receives input data 209 to be included in the channel signal that is transmitted to the receiver device 103. The data 209 is digital data, for example. In one embodiment, the input data 209 for inclusion in the channel signal is too large to be processed in one period of the configurable clock signal 203C. As a result, the configurable retimer circuit 205 retimes the input data 209 to generate retimed data 211. In one embodiment the configurable retimer circuit 205 retimes the data by adjusting a timing of the input data 209 so that the data can be processed according to one period of the configurable clock signal 203C.

The configurable multiplexor circuit 207 receives the retimed data 211 from the configurable timer circuit 211. The configurable multiplexor circuit 207 is configured to select the retimed data for output as serialized data 217 to the transmitter circuit 109 for transmission in the channel signal according to the configurable clock signal 203B. By serially outputting the data 217, latency is reduced compared to conventional transmitter devices that process the data in parallel.

The transmitter circuit 109 receives the serialized data 217 from the configurable timer circuit 111 and transmits the channel signal including the serialized data 217 to the receiver device 103 via the channel 105. In one embodiment, the transmitter circuit 109 includes a multiplexor 213 and a driver circuit 215. The multiplexor 213 selects the serialized data for output via the driver circuit 215 according to clock signals 203A. The driver circuit 215 outputs the channel signal including the selected serialized data to the receiver device 103.

Configurable Timer Circuit Architecture

Figure 3:
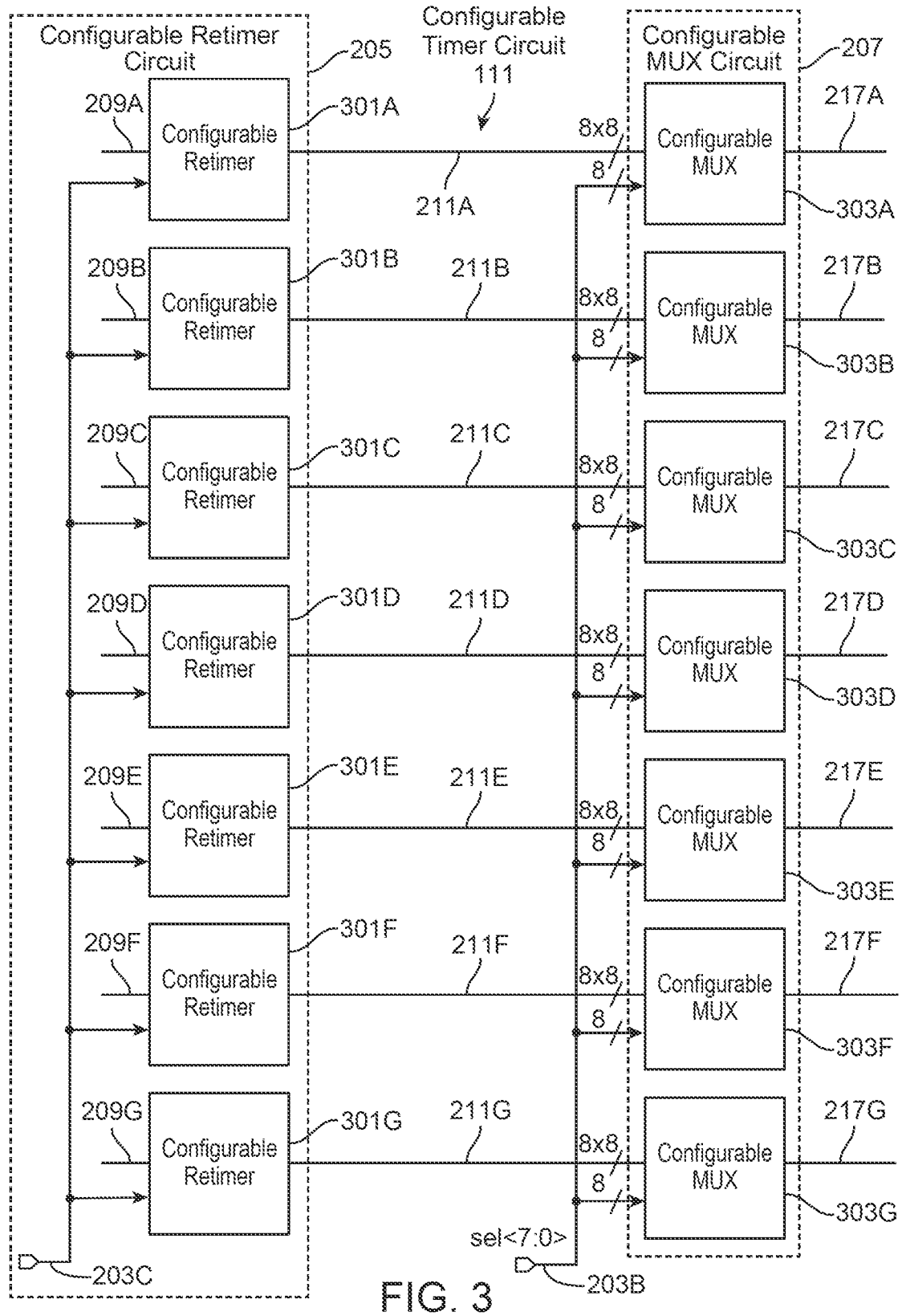
FIG. 3 is a detailed block diagram of a configurable timer circuit included in the configurable transmitter device, according to an embodiment.

FIG. 3 is a detailed block diagram of a configurable timer circuit 111 included in the configurable transmitter device 101, according to an embodiment. In one embodiment, the configurable retimer circuit 205 includes a plurality of configurable retimers 301A to 301G. Each configurable retimer 301 is configured to receive a particular bit N of the input data 209 and generates retimed data 211 for the bit N of the data input into the configurable retimer 301 according to the clock signal 203C where N is an integer from 0 to 7 in one embodiment. For example, configurable retimer 301A receives the most significant bit (MSB) of the input data 209A and outputs retimed data 211A for the MSB, configurable retimer 301B receives the second most significant bit of the input data 209B and outputs retimed data 211B for the second most significant bit, configurable retimer 301C receives the third most significant bit of the input data 209C and outputs retimed data 211C for the third most significant bit, configurable retimer 301D receives the fourth most significant bit of the input data 209D and outputs retimed data 211D for the fourth most significant bit, configurable retimer 301E receives the fifth most significant bit of the input data 209E and outputs retimed data 211E for the fifth most significant bit, configurable retimer 301F receives the sixth most significant bit of the input data 209F and outputs retimed data 211F for the sixth most significant bit, and configurable retimer 301G receives the least significant bit (LSB) of the input data 209G and outputs retimed data 211G for the LSB.

In one embodiment, the configurable multiplexor (MUX) circuit 207 includes a plurality of configurable multiplexors (MUX) 303A to 303G that receive the retimed data 211. The configurable MUXs 303A to 303G output serialized data 217A to 217G to the transmitter circuit 109 where each configurable multiplexor 303 outputs serialized data 217 for a corresponding bit N based on the received retimed data 211.

As shown in FIG. 3, each configurable MUX 303 is connected to a corresponding one of the plurality of configurable retimers 301 and receives the retimed data from the configurable retimer 201. For example, configurable MUX 303A is connected to configurable retimer 301A and receives the retimed data 211A for output as serialized data 217A, configurable MUX 303B is connected to configurable retimer 301B and receives the retimed data 211B for output as serialized data 217B, configurable MUX 303C is connected to configurable retimer 301C and receives the retimed data 211C for output as serialized data 217C, configurable MUX 303D is connected to configurable retimer 301D and receives the retimed data 211D for output as serialized data 217D, configurable MUX 303E is connected to configurable retimer 301E and receives retimed data 211E for output as serialized data 217E, configurable MUX 303F is connected to configurable retimer 301F and receives retimed data 211F for output as serialized data 217F, and configurable MUX 303G is connected to configurable retimer 301G and receives retimed data 211G for output as serialized data 217G.

Each configurable MUX 303 is configured to select the retimed data received from its corresponding configurable retimer 301 for output as serialized data 217 according to the clock signals 203B. In one embodiment, the clocks signals 203B include a plurality of selection signals sel<N> that control which portion of the retimed data 211 is output as serialized data 217, as will be further described below.

Configurable Timer Circuit 111 Reconfiguration

As mentioned previously, the transmitter device 101 can be configured to operate in one of a plurality of data rates where each data rate corresponds to a different mode of operation of the transmitter device 101. In one embodiment, the configurable timer circuit 111 is reconfigured depending on the mode of operation of the transmitter device 101. Generally, portions of the configurable retimers 301A to 301G and portions of the configurable MUXs 303A to 303G are enabled or disabled depending on the mode of operation of the transmitter device 101 as will be further described below.

First Mode

Figure 4A:
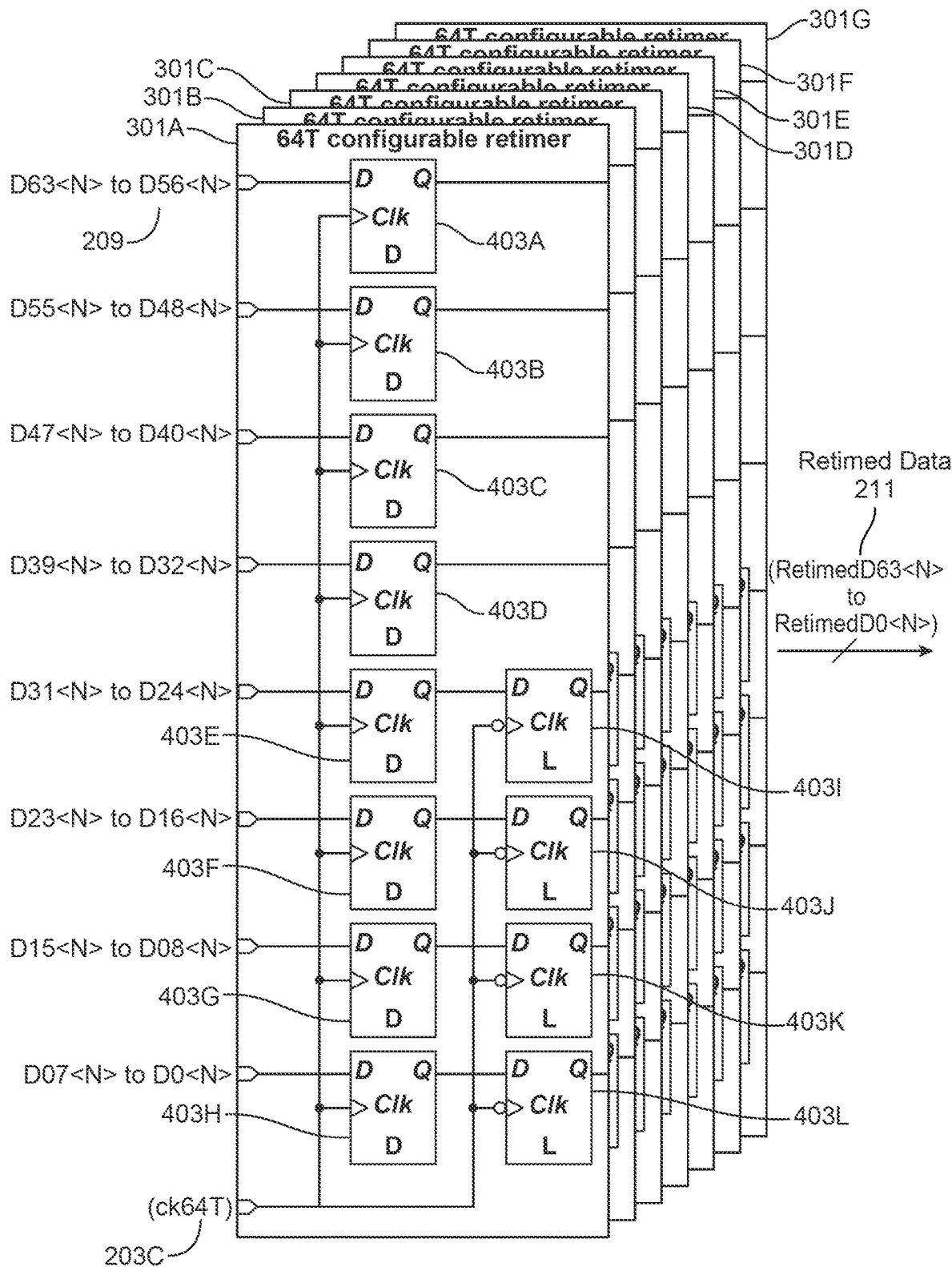
FIG. 4A is a detailed view of configurable retimers included in the configurable timer circuit during a first mode of the configurable transmitter device, according to an embodiment.

FIG. 4A is a high-level block diagram of configurable retimers 301A to 301G during the first mode of the transmitter device 101, according to an embodiment. As mentioned previously, the first mode of the transmitter device 101 corresponds to a maximum data rate of the transmitter device 101.

In one embodiment, each configurable retimer 301A to 301G includes a plurality of registers (e.g., flip flops) 403A to 403L. The plurality of registers 403 are arranged in a plurality of rows of registers. The rows of registers are divided into a first set of registers including registers 403A to 403D and a second set of registers including registers 403E to registers 403L. In one embodiment, the first set of registers 403A to 403D are configured to receive a first half (e.g., first portion) of the input data 209 and generate retimed data 211 for the first half of the input data based on the clock signal 203C which is a 64T clock in the first mode. In contrast, the second set of registers 403E to 403L are configured to receive a second half (e.g., second portion) of the input data 209 and generate retimed data 211 for the second half of the input data based on the clock signal 203C.

In the first mode, each register 403 in the first set of registers receives a corresponding portion of the first half of the input data 209. Each portion may have a size of eight bits during the first mode in one embodiment. For example, register 403A included in each configurable retimer 301 receives data D63 to D56 of a corresponding bit N and outputs retimed data D63 to D56, register 403B included in each configurable retimer 301 receives data D55 to D48 of a corresponding bit N and outputs retimed data D55 to D48, register 403C included in each configurable retimer 301 receives data D47 to D40 of corresponding bit N and outputs retimed data D47 to D40, and register 403D receives data D39 to D32 of corresponding bit N and outputs retimed data D39 to D32.

In the second set of registers, pairs of second registers are serially connected to each other to output the second half of the input data 209 based on clock signal 203C. For example, register 403E included in each configurable retimer 301 receives data D31 to D24 of the corresponding N bit and outputs retimed data D31 to D24 to an input D of register 403I that further delays the output of the retimed data D31 to D24, register 403F included in each configurable retimer 301 receives data D23 to D16 of the corresponding N bit and outputs retimed data D23 to D26 to an input D of register 403J that further delays the output of the retimed data D23 to D16, register 403G included in each configurable retimer 301 receives data D15 to D08 of the corresponding N bit and outputs retimed data D15 to D08 to an input D of register 403K that further delays the output of the retimed data D15 to D08, and register 403H included in each configurable retimer 301 receives data D07 to D00 of the corresponding N bit and outputs retimed data D07 to D00 to an input D of register 403L that further delays the output of the retimed data D07 to D00. The second set of registers are configured to delay the output of the second half of the retimed input data so that the input data 209 can be serially output during one period of the clock signal 203C. For example, data D63 to data D32 are output during the "high" level of the clock signal 203C and data D31 to D00 are output during the "low" level of the clock signal 203C as will be further described below.

Figure 4B:
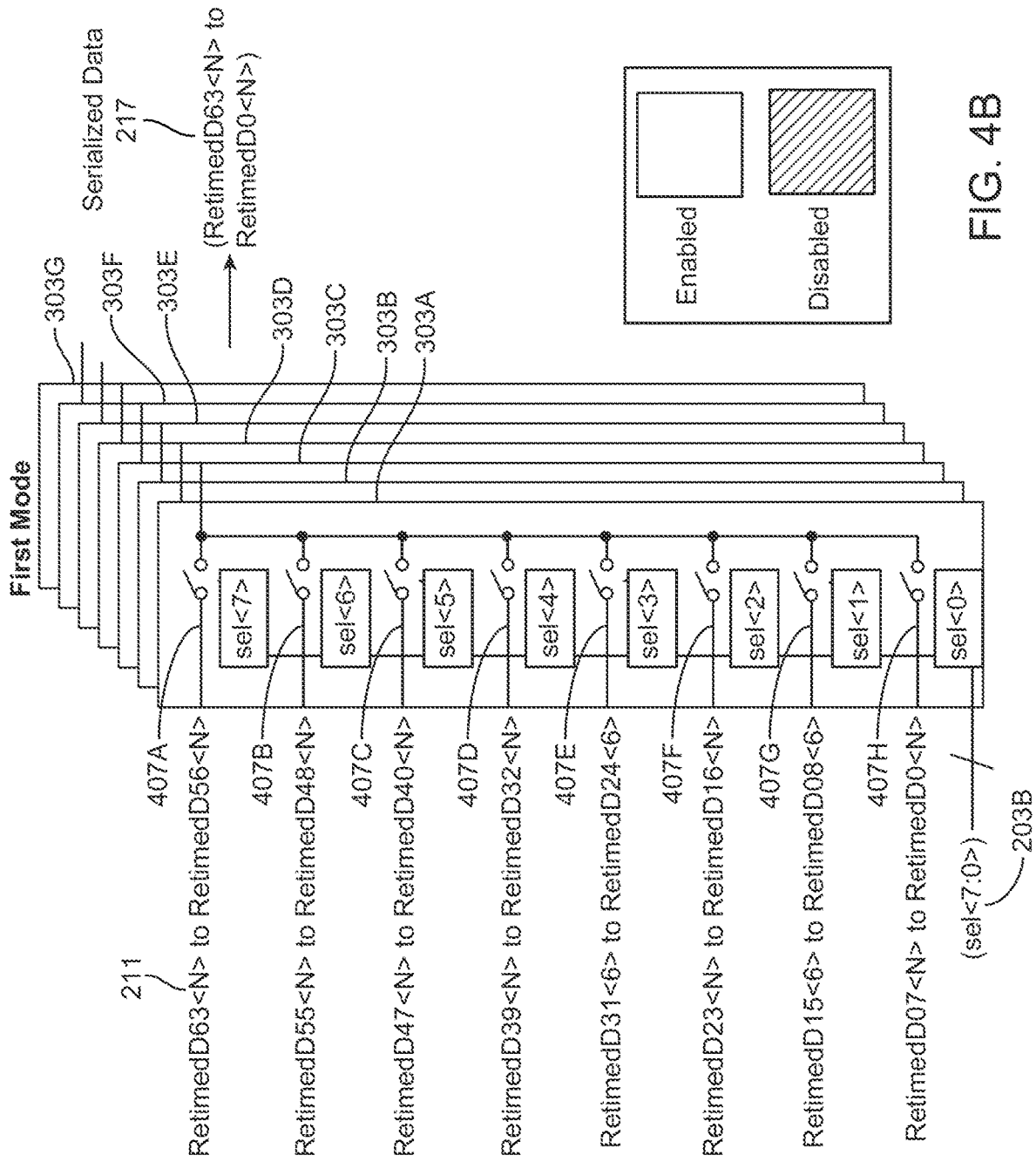
FIG. 4B is a detailed view of configurable multiplexors included in the configurable timer circuit during the first mode of the configurable transmitter device, according to an embodiment.

FIG. 4B is a high-level block diagram of configurable MUXs 303A to 303G during the first mode of the transmitter device 101, according to an embodiment. In one embodiment, each of the plurality of configurable MUXs 303A to 303G includes a plurality of switches 407A to 407H. Each of the plurality of switches 407 included in a given configurable MUX 303 is connected to the output (e.g., Q node) of a corresponding one of the registers 403 included in the configurable retimer 301 that is connected to the given configurable MUX 303. For example, an input of switch 407A is connected to the output of register 403A, an input of switch 407B is connected to the output of register 403B, an input of switch 407C is connected to the output of register 403C, an input of switch 407D is connected to the output of register 403D, an input of switch 407E is connected to the output of register 403I, an input of switch 407F is connected to the output of register 403J, an input of switch 407G is connected to the output of register 403L, and an input of switch 407H is connected to the output of register 403L.

Each of the plurality of switches 407 is configured to receive a corresponding portion of the retimed data 211 output by the register 403 that is connected to the switch 405. For example, switch 407A receives a portion of the retimed data 211 including RetimedD63 to RetimedD56, switch 407B receives a portion of the retimed data 211 including RetimedD55 to RetimedD48, switch 407C receives a portion of the retimed data 211 including RetimedD47 to RetimedD40, switch 407D receives a portion of the retimed data 211 including RetimedD39 to RetimedD32, switch 407E receives a portion of the retimed data 211 including RetimedD31 to RetimedD24, switch 407F receives a portion of the retimed data 211 including RetimedD23 to RetimedD16, switch 407G receives a portion of the retimed data 211 including RetimedD15 to RetimedD08, and switch 407H receives a portion of the retimed data 211 including RetimedD07 to RetimedD00.

The plurality of switches 407 are configured to sequentially output the retimed data 211 as serialized data 217 based on the clock signals 203B. In one embodiment, the clock signals 203B include a plurality of selection signals sel<7>, sel<6>, sel<5>, sel<4>, sel<3>, sel<2>, sel<1>, and sel<0> during the first mode. Each switch 407 is configured to output its corresponding portion of the retimed data 211 that is input to the switch 407 responsive to one of the selection signals to generate the serialized data 217. For example, switch 407A outputs retimed data RetimedD63 to RetimedD56 responsive to the selection signal sel<7>, switch 407B outputs retimed data RetimedD55 to RetimedD48 responsive to the selection signal sel<6>, switch 407C outputs retimed data RetimedD47 to RetimedD40 responsive to the selection signal sel<5>, switch 407D outputs retimed data RetimedD39 to RetimedD32 responsive to the selection signal sel<4>, switch 407E outputs retimed data RetimedD31 to RetimedD24 responsive to the selection signal sel<3>, switch 407F outputs retimed data RetimedD23 to RetimedD16 responsive to the selection signal sel<2>, switch 407G outputs retimed data RetimedD15 to RetimedD08 responsive to the selection signal sel<1>, and switch 407H outputs retimed data RetimedD07 to RetimedD0 responsive to the selection signal sel<0> to generate the serialized data 217.

In one embodiment, during the first mode where the transmitter device 101 transmits data at the first data rate (e.g., 56G baud rate) that corresponds to the maximum data rate of the transmitter device 101, all of the plurality of configurable MUXs 303A to 303F and all of the plurality of switches 407A to 407H included in the plurality of configurable MUXs 303A to 303F are enabled. That is, none of the configurable MUXs 303A to 303F and none of the switches 407A to 407H for each of the configurable MUXs 303A to 303F are disabled.

Figure 4C:
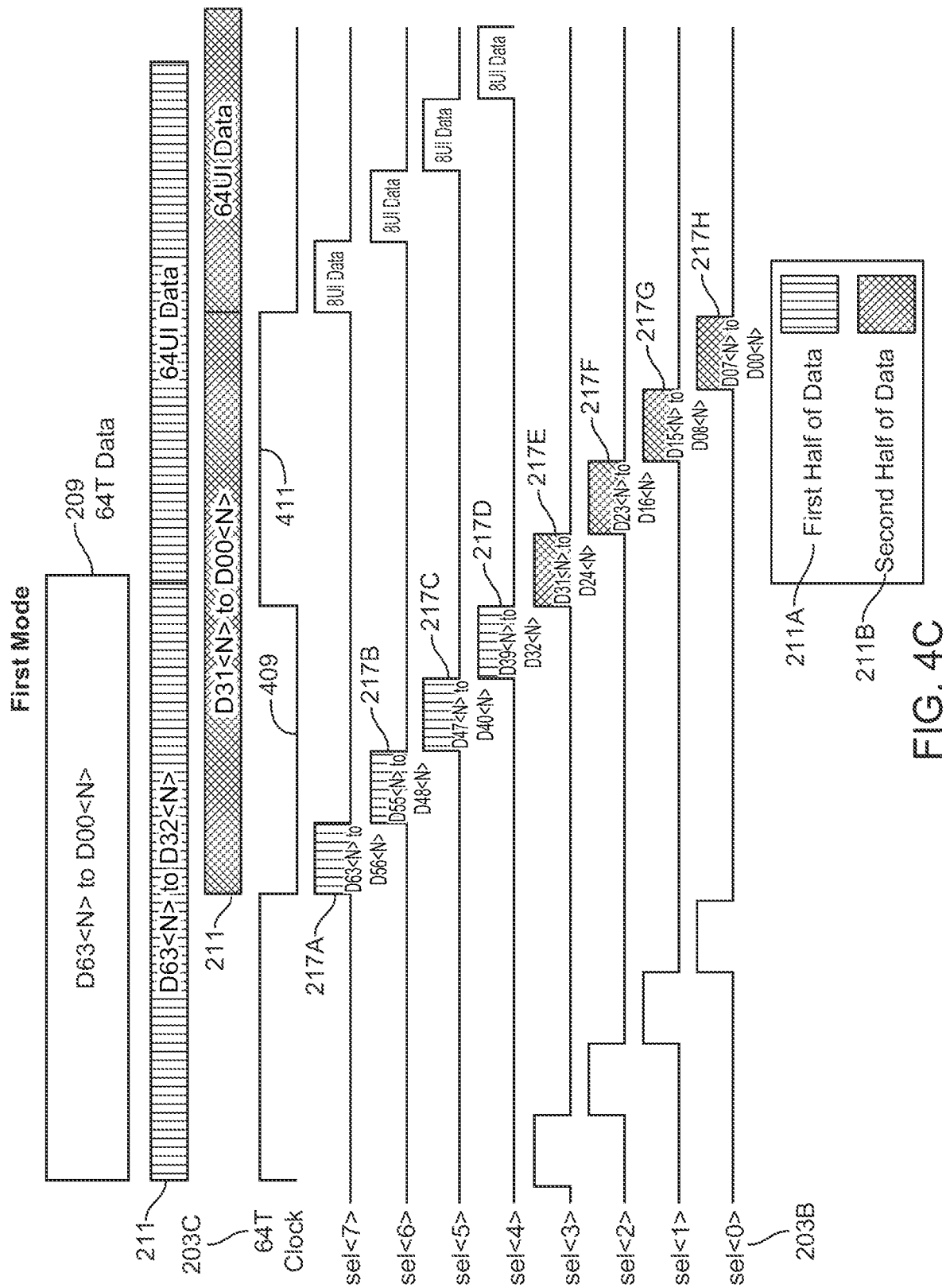
FIG. 4C is a wave form diagram of clock signals of the configurable transmitter device during the first mode, according to an embodiment.

FIG. 4C is a wave form diagram of clock signals 203 of the transmitter device 101 during the first mode, according to an embodiment. As mentioned above, all of the registers 403 included in configurable retimers 301 are enabled and all of the switches 407 included in configurable MUXs 4305 are enabled during the first mode. During the first mode, the configurable clock signal 203C that controls the retiming of the input data 209 is a 64T clock signal for example. One period of the clock signal 203C includes a first portion 409 that corresponds to a "low" level of the clock signal 203C and a second portion 411 that corresponds to a "high" level of the clock signal 203C.

The input data 209 inputted to the configurable retimers 301A to 301G includes data D63 to D00 for each bit N where N is an integer from 0 to 6. During the first mode, all of the input data 209 cannot be processed during the first portion 409 of the clock signal 203C. In one embodiment, the plurality of configurable retimers 301 adjust the timing of the input data 209 such that a first half of the input data 209 (e.g., D63 to D32 for bits N of the input data) is output by the configurable retimers 301 as a first half of retimed data 211A during the first portion 409 of the clock signal 203C and a second half of the input data 209 (e.g., D31 to D00 for bits N of the input data) is output by the configurable retimers 301 as a second half of retimed data 211B during the second portion 411 of the clock signal 411 as shown in FIG. 4C.

The retimed data 211 (e.g., the first half of the retimed data 211A and the second half of the retimed data 211B) is input to the configurable MUXs 303A to 303G. Each of the configurable MUXs 303A to 303G select a portion of the retimed data 211 for sequential output as serialized data 217 in response to clock signals 203B that includes selection signals sel<7> to sel<0>. For example, configurable MUXs 303A to 303G output serialized data 217A including retimed data D63 to D56 for bits N from the first half of the retimed data 211A responsive to selection signal sel<7>, configurable MUXs 303A to 303G then output serialized data 217B including retimed data D55 to D48 from the first half of the retimed data 211A for bits N responsive to selection signal sel<6>, configurable MUXs 303A to 303G then output serialized data 217C including retimed data D47 to D40 from the first half of the retimed data 211A for bits N responsive to selection signal sel<5>, configurable MUXs 303A to 303G then output serialized data 217D including retimed data D39 to D32 from the first half of the retimed data 211A for bits N responsive to selection signal sel<4>, configurable MUXs 303A to 303G then output serialized data 217E including retimed data D31 to D24 from the second half of the retimed data 211B for bits N responsive to selection signal sel<3>, configurable MUXs 303A to 303G then output serialized data 217F including retimed data D23 to D16 from the second half of the retimed data 211B for bits N responsive to selection signal sel<2>, configurable MUXs 303A to 303G then output serialized data 217G including retimed data D15 to D08 from the second half of the retimed data 211B for bits N responsive to selection signal sel<1>, and lastly configurable MUXs 303A to 303G output serialized data 217H including retimed data D07 to D00 from the second half of the retimed data 211B for bits N responsive to selection signal sel<0>.

Second Mode

Figure 5A:
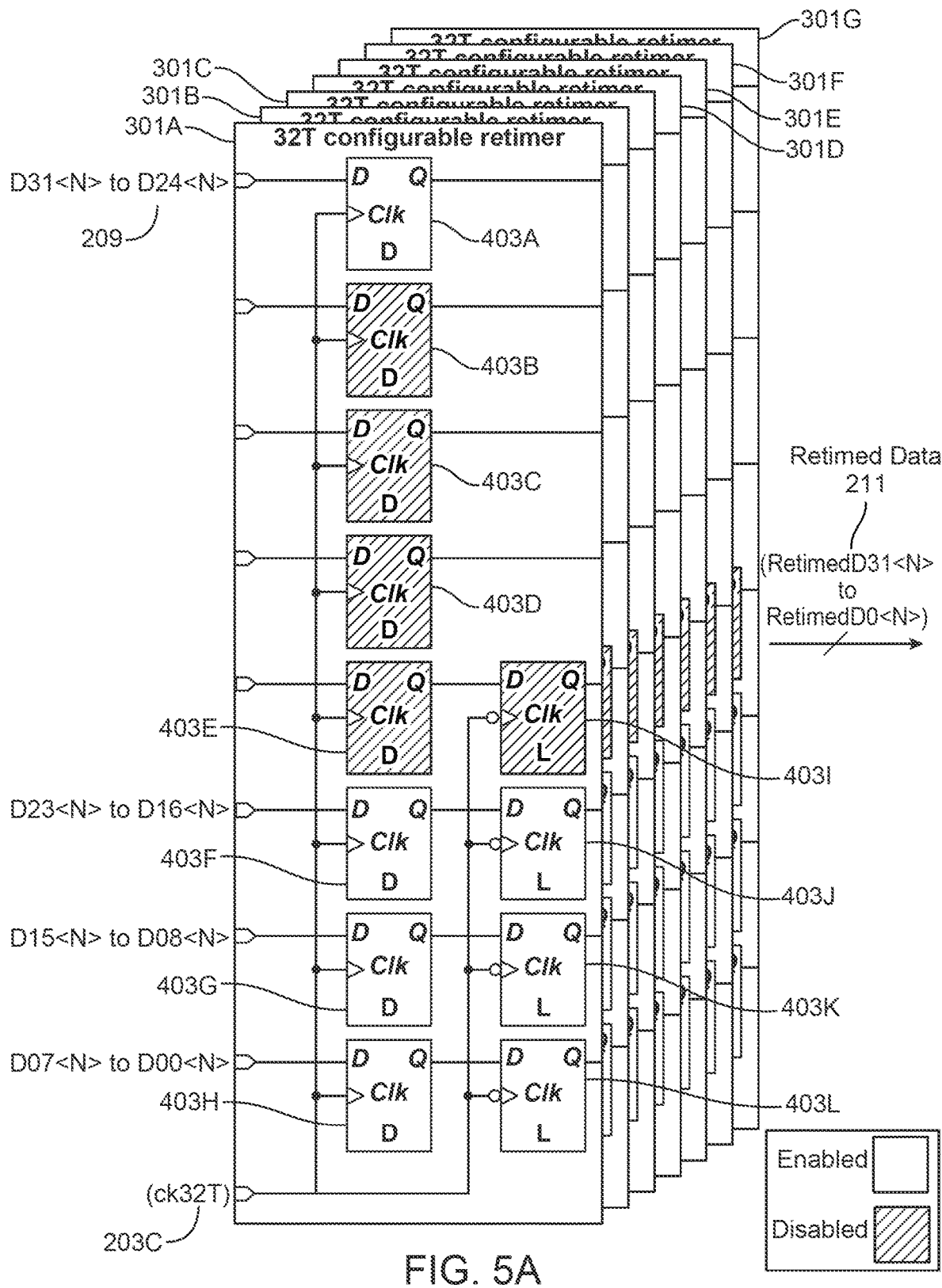
FIG. 5A is a detailed view of configurable retimers included in the configurable timer circuit during a second mode of the configurable transmitter device, according to an embodiment.

FIG. 5A is a high-level block diagram of configurable retimers 301 in FIG. 3 during the second mode of the transmitter device 101, according to an embodiment. In one embodiment, the second mode of the transmitter device 101 is a "half rate" mode. For example, during the second mode, the transmitter device 101 transmits data at the second data rate (e.g., 32G baud rate) that corresponds to half of the maximum data rate of the transmitter device 101. In one embodiment, the input data 209 for transmission during the second mode is half the size of the input data 209 during the first mode. For example, the input data 209 in the second mode has a size of 32 bits (e.g., data D31 to D0) for each of data bits N whereas the input data 209 in the first mode has a size of 64 bits (e.g., data D63 to D0) for each of bits N where N is 0 to 6.

In one embodiment, during the second mode, all of the configurable retimers 301A to 301G are still enabled. However, half of the plurality of rows of registers are enabled and half of the plurality of rows of registers 403 are disabled. As shown in FIG. 5A, the rows of enabled registers during the second mode include registers 403A, 403F, 403G, 403H, 403J, 403K, and 403L, and the rows of disabled registers include registers 403B, 403C, 403D, 403E, and 403I in one example.

Similar to the first mode, in the second mode the enabled registers are further sub-divided into a first set of registers including register 403A and a second set of registers including pairs of second registers 403E to registers 403L. In one embodiment, the first set of registers including register 403A is configured to receive a first portion of the input data 209 and generate retimed data 211 for the first portion of the input data based on the clock signal 203C which is a 32T clock in the second mode. In contrast, the second set of registers 403E to 403L are configured to receive a second portion of the input data 209 and generate retimed data 211 for the second portion of the input data based on the clock signal 203C.

In the second mode, each enabled register receives 8 bits of data from the input data 209 according to one embodiment. For example, register 403A included in the first set of registers receives data D31 to D24 of the bit N and outputs retimed data D31 to D24. In the second set of registers, pairs of second registers are serially connected to each other to retime the output of the second portion of the input data 209 based on clock signal 203C. For example, register 403F receives data D23 to D16 of bit N and outputs data D23 to D16 to an input D of register 403J that further delays the output of the data D23 to D16 to generate the retimed data D23 to D16, register 403G receives data D15 to D08 of bit N and outputs retimed data D15 to D08 to an input D of register 403K that further delays the output of data D15 to D08 to generate the retimed data D15 to D08, and register 403H receives data D07 to D00 of the bit N and outputs data D07 to D00 to an input D of register 403L that further delays the output of data D07 to D00 to generate the retimed data D07 to D00. The second set of registers are configured to delay the output of the second portion of the input data so that the input data 209 can be serially output by the configurable retimers 301 during one period of the clock signal 203C. For example, data D31 to data D24 for bits N are output by the configurable retimers 301 during the "high" level of the clock signal 203C and data D23 to D00 for bits N are output by the configurable retimers 301 during the "low" level of the clock signal 203C as will be further described below.

Figure 5B:
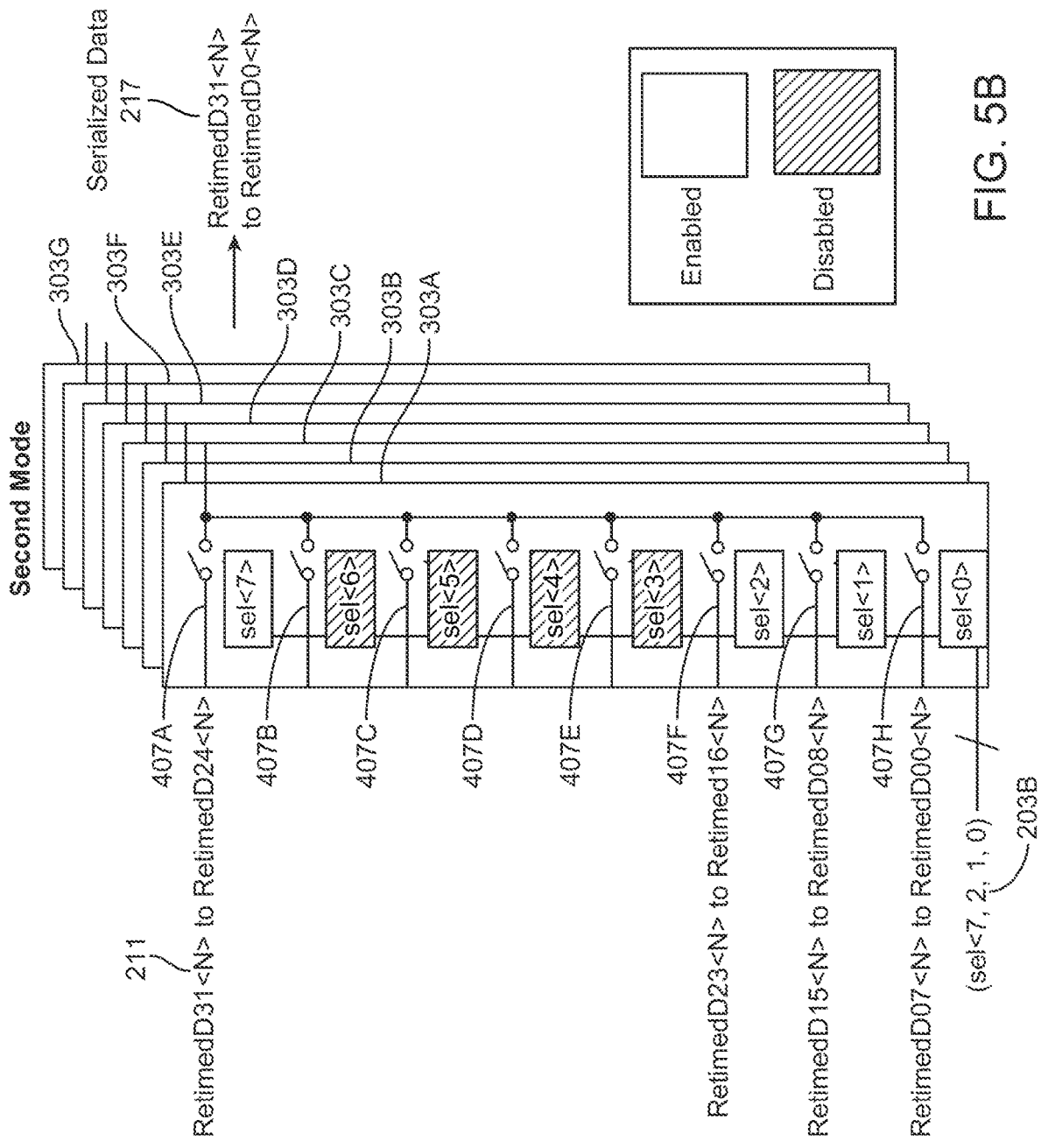
FIG. 5B is a detailed view of configurable multiplexors included in the configurable timer circuit during the second mode of the configurable transmitter device, according to an embodiment.

FIG. 5B is a high-level block diagram of configurable MUXs 303A to 303G shown in FIG. 3 during the second mode of the transmitter device 101, according to an embodiment.

Figure 5C:
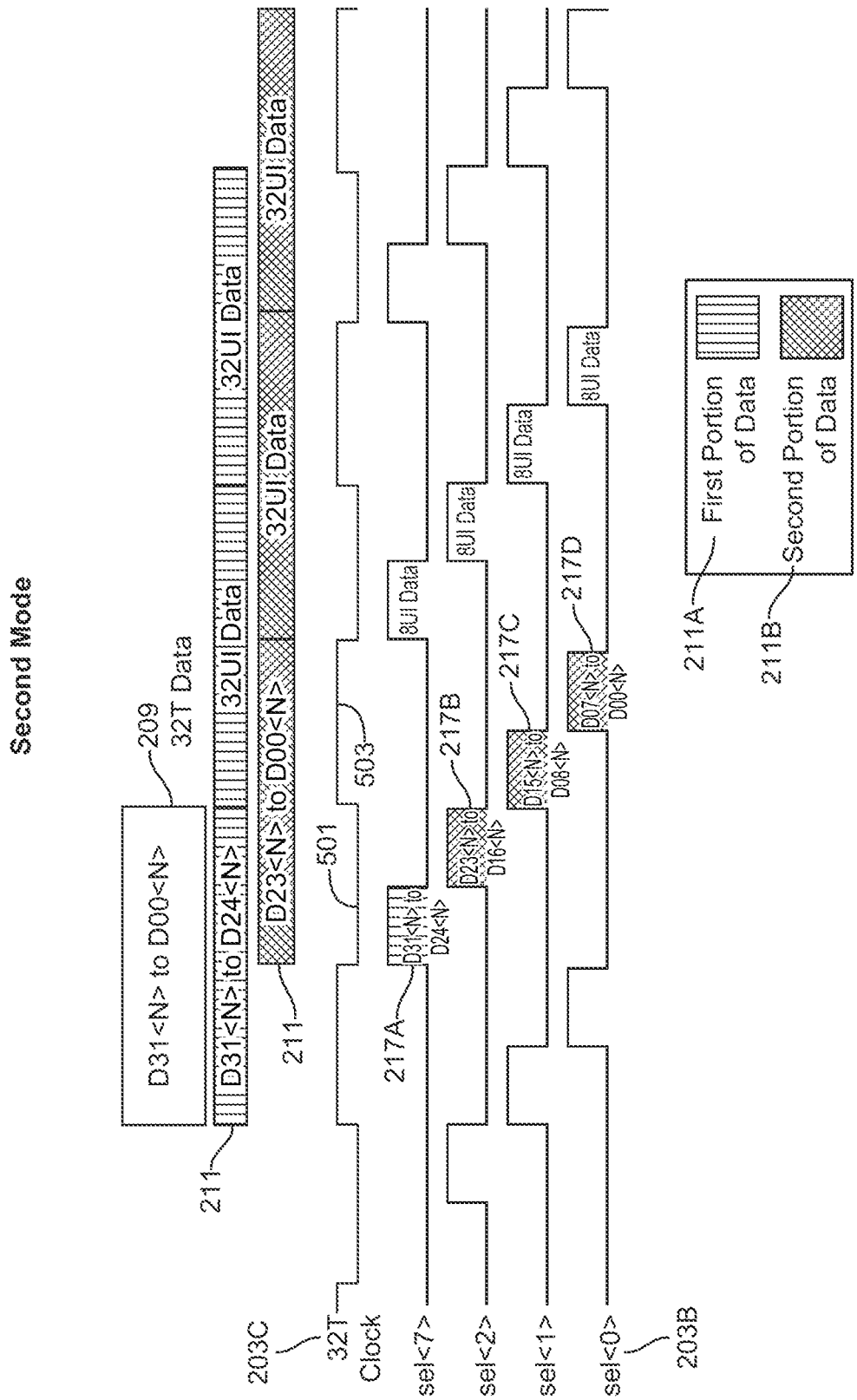
FIG. 5C is a wave form diagram of clock signals of the configurable transmitter device during the second mode, according to an embodiment.

In one embodiment, during the second mode where the transmitter device 101 transmits data at the second data rate (e.g., 32G baud rate) that corresponds to half of the maximum data rate of the transmitter device 101, all of the configurable MUXs 303A to 303G are enabled. However, a first portion (e.g., half) of the plurality of switches 407 included in each of the configurable MUXs 303 are enabled and a second portion (e.g., remaining half) of the plurality of switches 407 are disabled. As shown in FIG. 5C, the first portion of the switches 407 that are enabled during the second mode includes switches 407A, 407F, 407G, and 407H, and the second portion of the switches 407 that are disabled during the second mode includes switches 407B, 407C, 407D, and 407E in one example.

The enabled switches 407 are configured to sequentially output the retimed data 211 input into the enabled switches 407 as serialized data 217 based on the clock signals 203B. In one embodiment, during the second mode the clock signals 203B include a portion (e.g., half) of the selection signals included in the first mode. For example, during the second mode the clock signals 203B include selection signals sel<7>, sel<2>, sel<1>, and sel<0>. Each enabled switch 407 is configured to output the portion of the retimed data 211 that is input to the switch 407 responsive to one of the selection signals to generate the serialized data 217.

For example, switch 407A outputs retimed data RetimedD31 to RetimedD24 responsive to the selection signal sel<7>, switch 407F outputs retimed data RetimedD23 to RetimedD16 responsive to the selection signal sel<2>, switch 407G outputs retimed data RetimedD15 to RetimedD08 responsive to the selection signal sel<1>, and switch 407H outputs retimed data RetimedD07 to RetimedD00 responsive to the selection signal sel<0> to generate the serialized data 217. The disabled switches 407B to 407E do not receive any retimed data during the second mode and thus do not output serialized data during the second mode.

FIG. 5C is a wave form diagram of clock signals 203 of the transmitter device 101 operating in the second mode, according to an embodiment. As mentioned above, a portion of the registers 403 included in each of the configurable retimers 301 are enabled and a portion of the switches 407 included in each of the configurable MUXs 303 are enabled during the second mode. During the second mode, the configurable clock signal 203C that controls the retiming of the input data 209 is a 32T clock signal for example. One period of the clock signal 203C includes a first portion 501 that corresponds to a "low" level of the clock signal 203C and a second portion 503 that corresponds to a "high" level of the clock signal 203C.

The input data 209 inputted to the configurable retimers 301A to 301G includes data D31 to D00 for each bit N where N is an integer from 0 to 6. During the second mode, all of the input data 209 cannot be output by the configurable timer circuit 111 during the first portion 501 of the clock signal 203C. In one embodiment, the plurality of configurable retimers 301 included in the configurable retimer circuit 111 retimes the input data 209 such that a first portion of the input data (e.g., D31 to D24 for bits N of the input data 209) is output by the configurable retimers 301 as a first portion of retimed data 211A during a first part of the first portion 501 of the clock signal 203C and a second portion of the input data 209 (e.g., D23 to D00 for bits N of the input data 209) is output by the configurable retimers 301 as a second portion of retimed data 211B during the remaining part of the first portion 501 and the second portion 503 of the clock signal 203C as shown in FIG. 5C.

The retimed data 211 (e.g., the first portion of the retimed data 211A and the second portion of the retimed data 211B) is input to the configurable MUXs 303A to 303G. Each of the configurable MUXs 303A to 303G select a portion of the retimed data 211 for sequential output as serialized data 217 in response to clock signals 203B that includes selection signals sel<7>, sel<2>, sel<1>, and sel<0>. For example, configurable MUXs 303A to 303G output serialized data 217A including retimed data D31 to D24 for bits N from the first portion of the retimed data 211A responsive to selection signal sel<7>, configurable MUXs 303A to 303G then output serialized data 217B including retimed data D23 to D16 for bits N from the second portion of the retimed data 211B responsive to selection signal sel<2>, configurable MUXs 303A to 303G then output serialized data 217C including retimed data D15 to D08 for bits N from the second portion 211B of the retimed data responsive to selection signal sel<1>, and lastly configurable MUXs 303A to 303G output serialized data 217D including retimed data D07 to D00 from the second portion 211B of the retimed data for bits <N responsive to selection signal sel<O>.

Third Mode

Figure 6A:
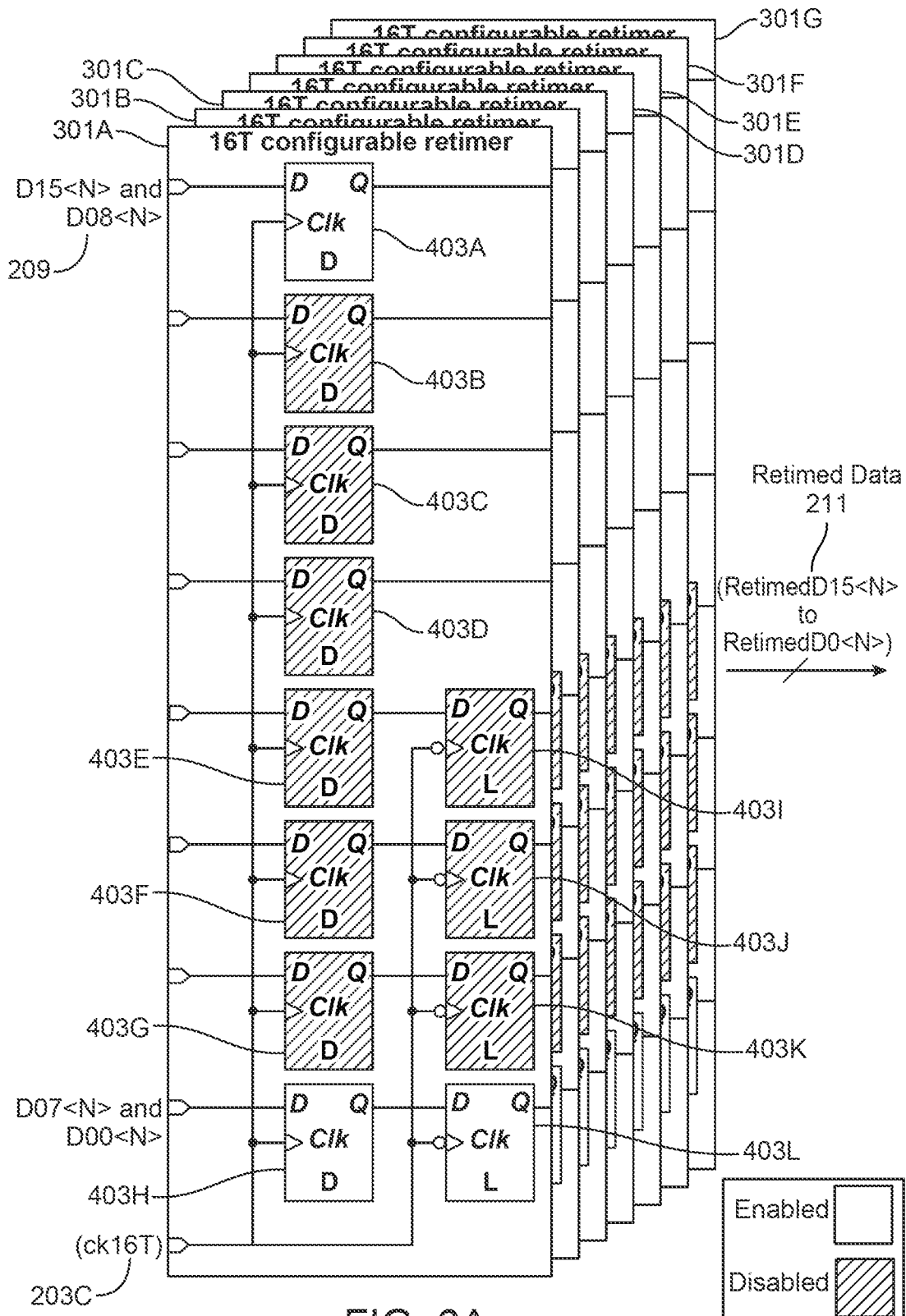
FIG. 6A is a detailed view of configurable retimers included in the configurable timer circuit during a third mode of the configurable transmitter device, according to an embodiment.

FIG. 6A is a high-level block diagram of the configurable retimers 301A to 301G shown in FIG. 3 during the third mode of the transmitter device 101, according to an embodiment. In one embodiment, the third mode of the transmitter device 101 is a "quarter rate" mode. For example, during the third mode, the transmitter device 101 transmits data at the third data rate (e.g., 16G baud rate) that corresponds to a quarter of the maximum data rate of the transmitter device 101. In one embodiment, the input data 209 for transmission during the third mode is a quarter of the size of the input data 209 during the first mode. For example, the input data 209 in the third mode has a size of 16 bits (e.g., data D15 to D00) for each of bits N whereas the input data 209 in the first mode has a size of 64 bits (e.g., data D63 to D00) for each of bits N where N is an integer from 0 to 6.

In one embodiment, during the third mode, all of the configurable retimers 301A to 301G are still enabled. However, similar to the second mode, a first plurality of rows of registers 403 included in each of the configurable retimers 301 are enabled and a second plurality of rows of registers 403 are disabled in the third mode. In one embodiment, the enabled first plurality of rows of registers is quarter of all of the plurality of rows of registers. As shown in FIG. 6A, the first plurality of rows of registers 403 that are enabled during the third mode include registers 403A, 403H, and 403L, and the second plurality of rows of registers that are disabled during the third mode includes registers 403B, 403C, 403D, 403E, 403F, 403G, 403I, 403J, and 403K in one example.

Similar to the first mode and the second mode, in the third mode the enabled registers are further sub-divided into a first set of registers including register 403A and a second set of pairs of second registers including register pair 403H and 403L. The first set of registers including register 403A is configured to receive a first half of the input data 209 and generate retimed data 211 for the first half of the input data based on the clock signal 203C which is a 16T clock in the third mode. In contrast, the second set of registers 403H and 403L are configured to receive a second half of the input data 209 and generate retimed data 211 for the second half of the input data 209 based on the clock signal 203C.

In the third mode, each enabled register receives 8 bits of data from the input data 209 according to one embodiment. For example, register 403A included in the first set of registers receives data D15 to D08 of bit N and outputs retimed data D15 to D08. In the second set of registers, the pairs of second registers are serially connected to each other to retime the output of the second half of the input data 209 based on clock signal 203C. For example, register 403H receives data D07 to D00 for bit N and outputs data D07 to D00 to an input D of register 403L that further delays the output of data D07 to D00 to generate the retimed data D07 to D00. The second set of registers are configured to delay the output of the second half of the input data so that the input data 209 can be serially output by the configurable retimers 301 during one period of the clock signal 203C. For example, data D15 to data D08 for bits N are output by the configurable retimers 301 during the "high" level of the clock signal 203C and data D07 to D00 for bits N are output by the configurable retimers 301 during the "low" level of the clock signal 203C as will be further described below.

Figure 6B:
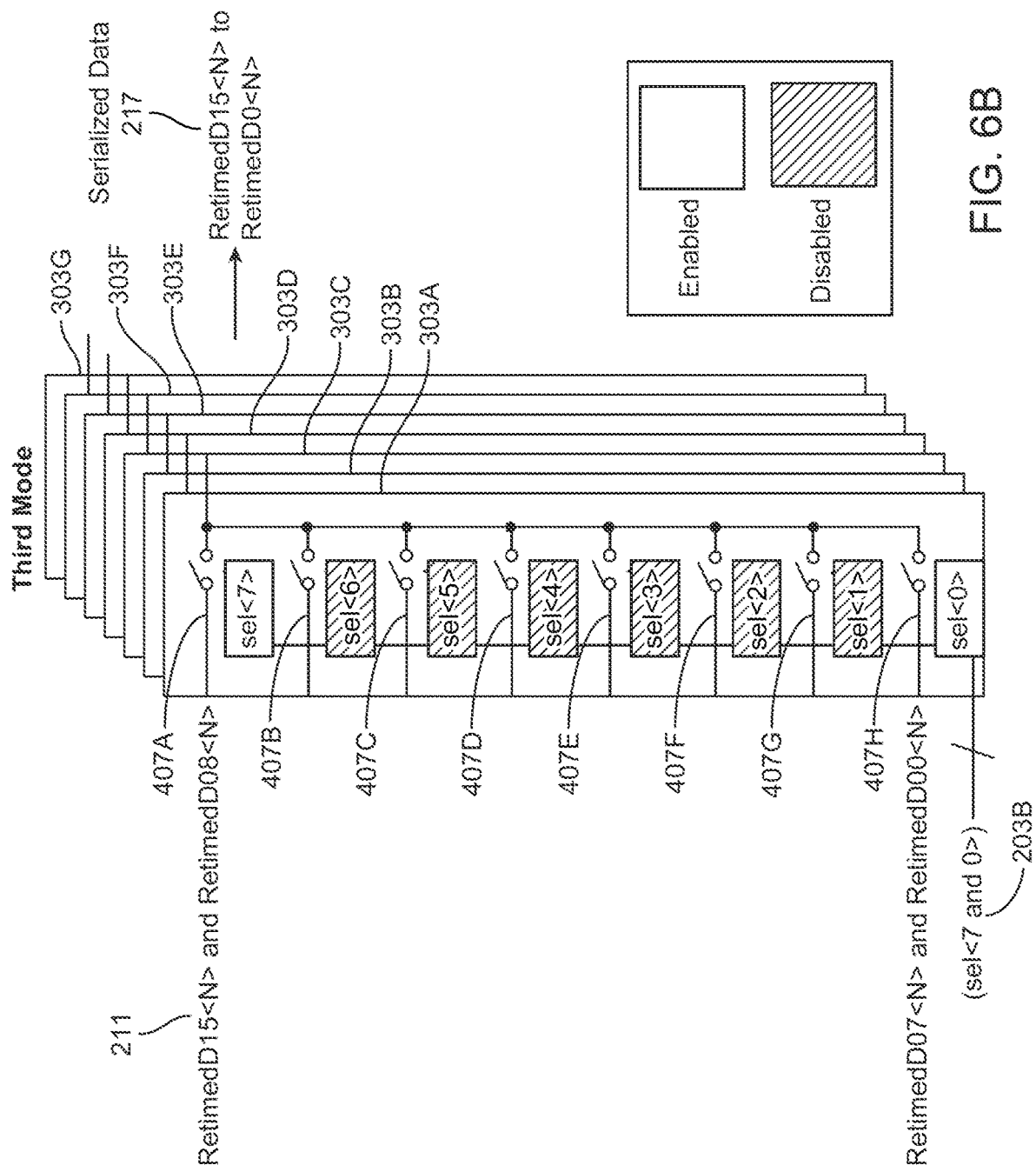
FIG. 6B is a detailed view of configurable multiplexors included in the configurable timer circuit during the third mode of the configurable transmitter device, according to an embodiment.

FIG. 6B is a high-level block diagram of configurable MUXs 303A to 303G shown in FIG. 3 during the third mode of the transmitter device 101, according to an embodiment. In one embodiment, during the third mode where the transmitter device 101 transmits data at the third data rate (e.g., 16G baud rate) that corresponds to a quarter of the maximum data rate of the transmitter device 101, all of the configurable MUXs 303A to 303G are enabled. However, a first portion of the plurality of switches 407 included in each of the configurable MUXs 303 are enabled and a second portion of the plurality of switches 407 are disabled. As shown in FIG. 6B, the first portion of the switches 407 that are enabled during the third mode includes switches 407A and 407H and the second portion of the switches 407 that are disabled during the third mode include switches 407B to 407G in one example.

The enabled switches 407 are configured to sequentially output the retimed data 211 input into the enabled switches 407 as serialized data 217 based on the clock signals 203B. In one embodiment, during the third mode the clock signals 203B include a portion of the selection signals included in the first mode. For example, during the third mode the clock signals 203B include selection signals sel<7> and sel<0>. Each enabled switch 407 is configured to output the portion of the retimed data 211 that is input to the switch 407 responsive to one of the selection signals to generate the serialized data 217. For example, switch 407A outputs retimed data RetimedD15 to RetimedD08 responsive to the selection signal sel<7> and switch 407H outputs retimed data RetimedD07 to RetimedD00 responsive to the selection signal sel<0> to generate the serialized data 217. The disabled switches 407B to 407G do not receive any retimed data during the third mode and thus do not output serialized data during the third mode.

Figure 6C:
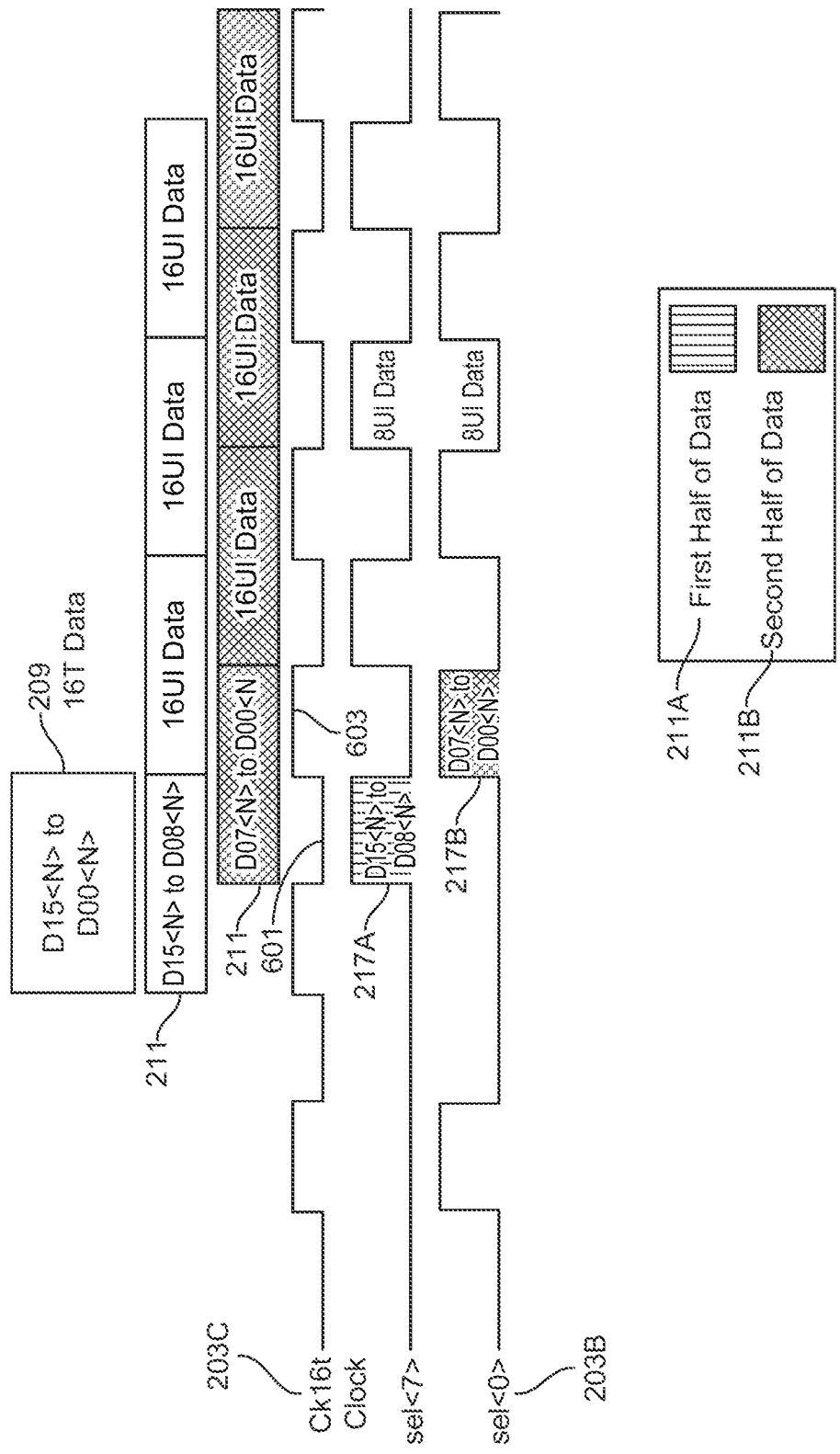
FIG. 6C is a wave form diagram of clock signals of the configurable transmitter device during the third mode, according to an embodiment.

FIG. 6C is a wave form diagram of clock signals 203 of the transmitter device 101 operating in the third mode, according to an embodiment. As mentioned above, a portion of the registers 403 included in each of the configurable retimers 301 are enabled and a portion of the switches 407 included in each of the configurable MUXs 303 are enabled during the third mode. During the third mode, the configurable clock signal 203C that controls the retiming of the input data 209 is a 16T clock signal for example. One period of the clock signal 203C includes a first portion 601 that corresponds to a "low" level of the clock signal 203C and a second portion 603 that corresponds to a "high" level of the clock signal 203C.

The input data 209 inputted to the configurable retimers 301A to 301G includes data D15 to D00 for each bit N where N is an integer from 0 to 6. During the third mode, all of the input data 209 cannot be output by the configurable timer circuit 111 during the first portion 601 of the clock signal 203C. In one embodiment, the plurality of configurable retimers 301 included in the configurable retimer circuit 111 retimes the input data 209 such that a first half of the input data (e.g., D15 to D08 for bits N of the input data 209) is output by the configurable retimers 301 as a first half of retimed data 211A during the first portion 601 of the clock signal 203C and a second half of the input data 209 (e.g., D07 to D00 for bits N of the input data 209) is output by the configurable retimers 301 as a second half of retimed data 211B during the second portion 603 of the clock signal 203C as shown in FIG. 6C.

The retimed data 211 (e.g., the first half of the retimed data 211A and the second half of the retimed data 211B) is input to the configurable MUXs 303A to 303G. Each of the configurable MUXs 303A to 303G selects a portion of the retimed data 211 for sequential output as serialized data 217 in response to clock signals 203B that includes selection signals sel<7> and sel<0> during the third mode. For example, configurable MUXs 303A to 303G output serialized data 217A including retimed data D15 to D08 for bits N from the first half of the retimed data 211A responsive to selection signal sel<7> and configurable MUXs 303A to 303G output serialized data 217B including retimed data D07 to D00 from the second half 211B of the retimed data for bits N responsive to selection signal sel<0>.

Method Flow Diagrams

Figure 7:
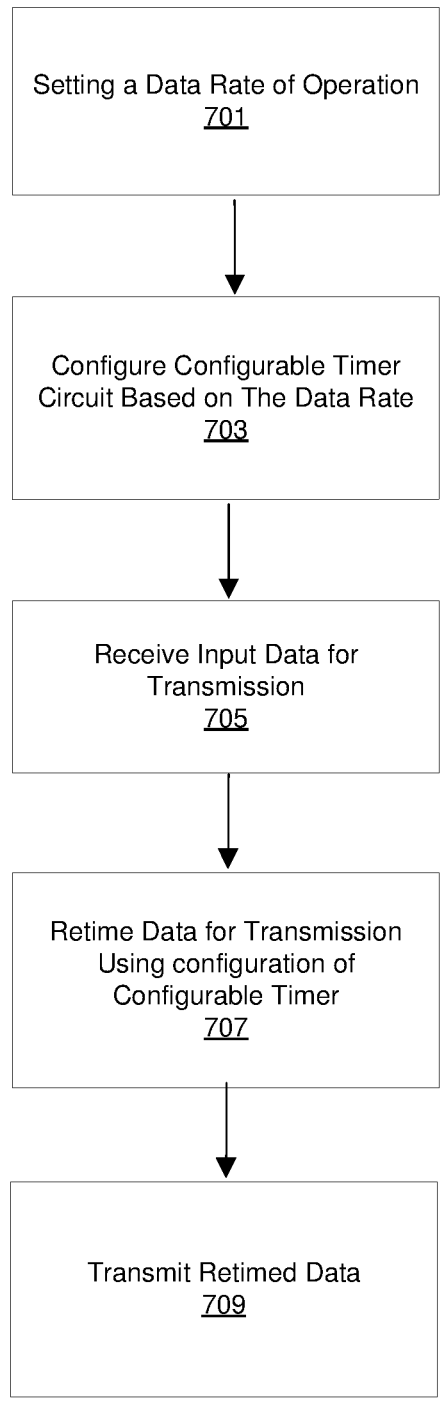
FIG. 7 illustrates a method flow diagram describing a method of the configurable transmitter device for transmitting data, according to an embodiment.

FIG. 7 is a method flow diagram describing data transmission of the transmitter device 101 according to one embodiment. Note in other embodiments, other steps may be shown than those illustrated in FIG. 7.

In one embodiment, the transmitter device 101 sets 701 a data rate of operation of the transmitter device. The data rate may be selected from a plurality of different data rates that correspond to a maximum data rate of the transmitter device 101, a minimum data rate of the transmitter device, and an intermediate data rate of the transmitter device 101, for example.

The configurable timer circuit 111 included in the transmitter device 101 is configured 703 according to the set data rate. In one embodiment, the configurable timer circuit 111 is configured by enabling at least a portion of each configurable retimer 301 and enabling a portion of each configurable MUX 303 included in the configurable timer circuit 111 according to the data rate.

The transmitter device 101 receives 705 input data for transmission and retimes 707 the input data for transmission using the configuration of the configurable timer circuit 111. The transmitter device 101 transmits 709 the retimed data retimed by the configurable timer circuit 111.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a receiver having ADCs with an adjustable sampling clock through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A transmitter device comprising:
a clock circuit configured to generate a clock signal associated with a data rate of the transmitter device;
a configurable timer circuit including a plurality of retimers configured to receive input data and adjust a timing of the input data to generate retimed input data according to the clock signal, each of the plurality of retimers including a plurality of registers arranged in a plurality of rows of registers where each register is configured to receive a different portion of the input data and output a corresponding portion of the retimed input data according to the clock signal; and
a transmitter circuit coupled to a communications channel, the transmitter circuit configured to transmit serialized data based on the retimed input data to a receiver device over the communications channel at the data rate,
wherein responsive to the transmitter device being configured to operate at the data rate that is a portion of a maximum data rate of the transmitter device, a portion of the plurality of rows of registers of at least one of the plurality of retimers is enabled to adjust the timing of the input data and a remaining portion of the plurality of rows of registers of the at least one of the plurality of retimers is disabled.

2. The transmitter device of claim 1, wherein the input data received by each of the plurality of retimers is associated with a different bit of the input data.

3. The transmitter device of claim 1, wherein the plurality of registers included in each of the plurality of retimers includes:
- a first set of registers, each register from the first set configured to receive a different portion of the input data and output a corresponding portion of the retimed input data according to the clock signal; and
- a second set of registers including a plurality of pairs of second registers, a first register included in each pair of second registers configured to receive a different portion of the input data and output a corresponding portion of the retimed input data to a second register that is serially connected to the first register included in the pair, the second register in each pair delaying an output of the respective portion of the retimed input data according to the clock signal.

4. The transmitter device of claim 3, wherein responsive to the data rate being the portion of the maximum data rate, a total number of registers included in each of the plurality of retimers that are enabled is less than a total number of registers that are enabled during the maximum data rate of the transmitter device.

5. The transmitter device of claim 4, wherein responsive to the data rate being half of the maximum data rate, half of the plurality of rows of registers are enabled and a remaining half of the plurality of rows of registers are disabled,
- wherein the half of the plurality of rows that are enabled includes a register from the first set of registers and a plurality of pairs of second registers from the second set of registers.

6. The transmitter device of claim 4, wherein responsive to the data rate being a quarter of the maximum data rate, a quarter of the plurality of rows of registers are enabled and remaining rows of registers from the plurality of rows of registers are disabled,
- wherein the quarter of the plurality of rows that are enabled includes one register from the first set of registers and one pair of second registers from the second set of registers.

7. The transmitter device of claim 3, wherein the configurable timer circuit further includes a plurality of multiplexors, each multiplexor of the plurality of multiplexors coupled to a corresponding retimer from the of plurality of retimers and configured to receive the retimed input data output by the corresponding retimer and select the retimed input data for output as a portion of the serialized data according to a plurality of selection signals.

8. The transmitter device of claim 7, wherein each multiplexor of the plurality of multiplexors includes a plurality of switches, each switch from the plurality of switches configured to receive a different portion of the retimed input data received from the corresponding retimer and output a different portion of the serialized data responsive to a corresponding selection signal from the plurality of selection signals.

9. The transmitter device of claim 8, wherein responsive to the data rate being the portion of the maximum data rate, a total number of the plurality of switches included in each of the plurality of multiplexors that are enabled is based on a proportion of the data rate to the maximum data rate of the transmitter device.

10. The transmitter device of claim 9, wherein responsive to the data rate being half of the maximum data rate, half of the plurality of switches of each of the plurality of multiplexors are enabled and a remaining half of the plurality of switches are disabled.

11. The transmitter device of claim 10, wherein responsive to the data rate being a quarter of the maximum data rate, a quarter of the plurality of switches of each of the plurality of multiplexors are enabled and remaining switches from the plurality of switches are disabled.

12. The transmitter device of claim 11, wherein the clock circuit is configured to generate a plurality of different clock signals, each clock signal associated with a corresponding data rate from a plurality of data rates of the transmitter device.

13. The transmitter device of claim 12, wherein a first clock signal from the plurality of different clock signals is associated with the maximum data rate and has a first frequency, a second clock signal from the plurality of different clock signals is associated with the quarter of the maximum data rate has a second frequency that is less than the first frequency, and a third clock signal from the plurality of different clock signals is associated with the half of the maximum data rate has a third frequency that is less than the first frequency but greater than the second frequency.

14. A method of a transmitter device including a configurable timer circuit comprising a plurality of retimers that each include a plurality of registers arranged in a plurality of rows of registers where each register is configured to receive a different portion of input data and output a corresponding portion of the retimed input data according to a clock signal, the method comprising:
- setting a data rate of operation of the transmitter device from a plurality of data rates;
- responsive to the data rate being a portion of a maximum data rate of the transmitter device, reconfiguring the configurable timer circuit by enabling a portion of the plurality of rows of registers at least one of the plurality of retimers and disabling a remaining portion of the plurality of rows of registers of the at least one of the plurality of retimers;
- receiving the input data for transmission by the transmitter device at the data rate;
- adjusting a timing of the input data using the enabled portion of the plurality of rows of registers of the at least one of the plurality of retimers to generate retimed input data according to clock signal that is associated with the data rate; and
- transmitting serialized data that is based on the retimed input data to a receiver device over a communications channel at the data rate.

15. The method of claim 14, wherein each of the plurality of retimers receives input data that is associated with a different bit of the input data.

16. The method of claim 14, the method further comprising:
- responsive to the data rate being half of the maximum data rate, enabling half of the plurality of rows of registers included in each of the plurality of retimers and disabling a remaining half of the plurality of rows of registers included in each of the plurality of retimers.

17. The method of claim 16, further comprising:
- responsive to the data rate being a quarter of the maximum data rate, enabling a quarter of the plurality of rows of registers included in each of the plurality of retimers, and disabling remaining rows of registers from the plurality of rows of registers included in each of the plurality of retimers.

18. The method of claim 14, wherein the configurable timer circuit further includes a plurality of multiplexors coupled to the plurality of retimers, each multiplexor of the plurality of multiplexors includes a plurality of switches, each switch from the plurality of switches configured to receive a different portion of the retimed input data received from a corresponding retimer and output a different portion of the serialized data responsive to a corresponding selection signal from a plurality of selection signals, the method further comprising:

responsive to the data rate being half of the maximum data rate, enabling half of the plurality of switches of each of the plurality of multiplexors to select different portions of the retimed input data for output as a portion of the serialized data, and disabling a remaining half of the plurality of switches.

19. The method of claim 18, further comprising:
responsive to the data rate being a quarter of the maximum data rate, enabling a quarter of the plurality of switches of each of the plurality of multiplexors to select different portions of the retimed input data for output as a portion of the serialized data, and disabling remaining switches from the plurality of switches.

20. The method of claim 19, further comprising:
generating a plurality of clock signals, each clock signal associated with a different data rate from the plurality of data rates including a first clock signal, a second clock signal, and a third clock signal,
wherein the first clock signal is associated with the maximum data rate and has a first frequency, the second clock signal is associated with the quarter of the maximum data rate and has a second frequency that is less than the first frequency, and the third clock signal is associated with half of the maximum data rate and has a third frequency that is less than the first frequency but greater than the second frequency.

* * * * *